| United States Patent [19] | [11] | 4,035,323 |
|---|---|---|
| Mathis | [45] | July 12, 1977 |

[54] STABILIZATION OF OLEFIN POLYMERS

[75] Inventor: Ronald D. Mathis, Taylors, S.C.

[73] Assignee: Phillips Petroleum Company, Bartlesville, Okla.

[21] Appl. No.: 602,355

[22] Filed: Aug. 6, 1975

[51] Int. Cl.² .................................... C08K 5/34
[52] U.S. Cl. .......................... 260/23 XA; 252/405; 260/45.85 B; 260/45.8 N; 260/45.95 R
[58] Field of Search ... 260/23 XA, 45.8 N, 45.85 B, 260/45.8 R, 45.85 R; 252/405, 47, 148; 11/438

[56] References Cited

U.S. PATENT DOCUMENTS

| 3,502,613 | 3/1970 | Berger | 260/45.8 R |
| 3,640,928 | 2/1972 | Murrayama | 260/23 XA |
| 3,838,099 | 9/1974 | Mathis | 260/45.75 N |
| 3,840,494 | 10/1974 | Murrayama | 260/45.8 N |

Primary Examiner—V. P. Hoke
Assistant Examiner—William E. Parker

[57] ABSTRACT

Homopolymers and copolymers of 1-olefins are protected against the deleterious effects of ulraviolet light by incorporating therein an additive system consisting of a piperidine derivative and a hydroxy-substituted phenyl benzoate in an amount sufficient to prevent such deterioration.

16 Claims, No Drawings

STABILIZATION OF OLEFIN POLYMERS

This invention relates to polyolefin stabilization.

The importance of protecting 1-olefin polymers against the degradative effect of sunlight is well known. Numerous additives have been found to be effective, to varying degrees, for certain polymer compositions to provide this protection.

It is an object of this invention to provide an ultraviolet light stabilizing system for polyolefins.

It is another object to provide polyolefins stabilized against the degradative effect of ultraviolet light.

Other objects and advantages of the present invention will be apparent from a reading of the specification and appended claims.

In accordance with the present invention there is provided a poly-olefin composition stabilized against the effects of ultraviolet light degradation comprising a normally solid polymer of an aliphatic 1-olefin having from 2 to 8 carbon atoms per molecule having incorporated therein a stabilizing amount of a stabilizer system consisting of:

A. a piperidine derivative selected from the group consisting of 1. compounds of the formula

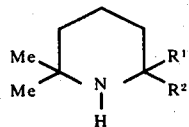

wherein Me is methyl, and $R^1$ and $R^2$ are individually selected from the group consisting of hydrogen and an alkyl member of 1 to 4 carbon atoms;

2. compounds of the formula

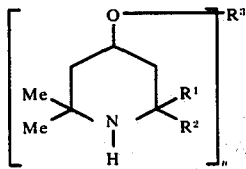

wherein Me, $R^1$ and $R_2$ are as described above, and $n$ is an integer having a value of 1 or 2, wherein when $n$ is 1, $R^3$ is selected from the group consisting of hydrogen and an acyl member derived from an unsubstituted, saturated aliphatic monocarboxylic acid having from 6 to 20 carbon atoms or an unsubstituted or alkyl-substituted aromatic monocarboxylic acid having from 7 to 20 carbon atoms, when $n$ is 2, $R^3$ is a diacyl member derived from a staturated, unsubstituted aliphatic dicarboxylic acid having from 6 to 20 carbon atoms or an unsubstituted or alkyl-substituted aromatic dicarboxylic acid having from 8 to 20 carbon atoms; and 3. compounds of the formula

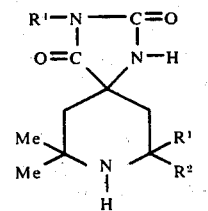

wherein Me, $R^1$ and $R^2$ are as defined above and $R^4$ is a member selected from the group consisting of hydrogen and alkyl having from 1 to 12 carbon atoms; and B. a hydroxy-substituted phenyl benzoate represented by the formula

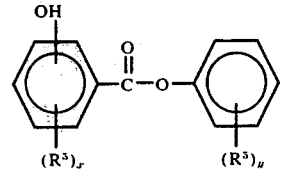

wherein each $R^5$ member is independently selected from the group consisting of halogen, an alkyl, alkoxy, cycloalkyl, cycloalkoxy, aryl, or aryloxy member having up to 20 carbon atoms, $x$ is an integer having a value of from 0 to 4 and $y$ is an integer having a value of from 0 to 4.

The term "polyolefin" as used herein is intended to include homopolymers and copolymers of aliphatic 1-olefins having from 2 to 8 carbon atoms per molecule. The term includes homopolymers such as polyethylene, polypropylene and polybutylene, and copolymers of ethylene/propylene, ethylene/1-butene, ethylene/1-hexene, ethylene/1-octene and the like. Presently preferred polymers include propylene and propylene/1-olefin copolymers containing at least about 90 mole percent propylene and from about 0.5 to about 10 mole percent comonomer. Also suitable for stabilization in accordance with the present invention are blends of polyolefins with other polymers such as the polystyrenes, polyvinyl chlorides, polyvinyl acetates, polyamides and the like and mixtures thereof.

Examples of the piperidine derivatives of Formula (A) (1), above, empolyed in this invention include:
2,2-dimethylpiperidine,
2,2,6-trimethylpiperidine,
2,2,6,6-tetramethylpiperidine,
2,2-dimethyl-6,6-diethylpiperidine,
2,2,6-trimethyl-6-ethylpiperidine,
2,2-dimethyl-6,6-dipropylpiperidine,
2,2-dimethyl-6,6-di-n-butylpiperidine,
and the like.

Examples of the piperidine derivatives of Formula (A) (2), above, employed in the present invention include:
4hydroxy-2,2-dimethyl-6,6-di-n-propylpiperidine,
4-acetoxy-2,2dimethyl-6-ethylpiperidine,
2,2,6,6-tetramethyl-4-octanoyloxypiperidine,
4-lauroyloxy-2,2-dimethyl-6,6-di-n-butylpiperidine,
2,2,6,6-tetramethyl-4-stearoyloxypiperidine, 4-benzoyloxy-2,2,6,6-tetramethylpiperidine,
2,2,6,6-tetramethyl-4-p-toluoyloxypiperidine,
2,2,6,6-tetramethyl-4-($\beta$-naphthoyloxy)piperdine,
Bis(2,2,6,6-tetramethyl-4-piperidyl)adipate,
Bis(2,2,6,6-tetramethyl-4-piperidyl)terephthalate,
4-salicyloyloxy-2,2,6,6-tetramethylpiperidine,
4-hydroxy-4-octloxybenzoyloxy)-2,2-dimethylpiperidine,
4-(3,5-di-t-butyl-2-hydroxybenzoyloxy)-2,2,6,6-tetramethylpiperidine,
4-(3,5-di-t-butyl-4-hydroxybenzoyloxy)-2,2,6,6-tetramethylpiperidine,
Bis(2,2,6,6-tetramethyl-4-piperidyl)sebacate,
and the like.

In a presently preferred embodiment the piperidine derivative of Formula (A) (2) is bis(2,2,6,6-tetramethyl-4-piperidyl)sebacate.

Examples of piperidine derivatives of Formula (A) (3), above, employed in the present invention include:
1,3,8-triaza-2,4-dioxo-3-octyl-7,7,9,9-tetramethyl-spiro[4.5]decane,
1,3,8-triaza-2,4-dioxo-3-n-butyl-7,7-dimethyl-9,9-di-n-butyl-spiro[4.5]decane,
1,3,8-triaza-2,4-dioxo-7,7-dimethyl-9-ethyl-sprio[4,5]decane,
1,3,8-triaza-2,4-dioxo-3-dodecyl-7,7-dimethyl-spiro[4,5]decane,
and the like.

In a presently preferred embodiment the piperidine derivative of Formula (A) (3) above is 1,3,8-triaza-2,4dioxo-3-octyl-7,7,9,9-tetramethyl-spiro[4,5]decane.

Examples of hydroxy-substituted phenyl benzoates that can be employed in the present invention are:
phenyl 4-hydroxybenzoate,
2,4-di-t-butylphenyl 3,5,-di-t-butyl-4-hydroxybenzoate,
2,4-dicyclooctylphenyl 3,5-dicyclooctyl-4-hydroxybenzoate,
2,4-dioctadecylphenyl 3,5-dipentadecyl-4-hydroxybenzoate,
2,4-di(2,2-dimethylpentyl)phenyl 3,5-di(2,2-dimethylpentyl)-4-hydroxybenzoate,
4-octylphenyl 3,5-di-t-butyl-4-hydroxybenzoate,
3,5-dilaurylphenyl 3,5-di-t-octyl-4-hydroxbenzoate,
2-t-butylphenyl 3,5-di(2,2-diethylbutyl)-4-hydroxybenzoate,
2-chloro-4-octylphenyl 3,5-di-t-butyl-4-hydroxybenzoate,
p-bromophenyl 2,4-di-t-butyl-3-hydroxbenzoate,
2-phenylphenyl 3,5-di-t-butyl-4 -hydroxbenzoate,
4-phenylphenyl 3,5-di-t-butyl-4-hydroxybenzoate,
4-methoxyphenyl 3,5-di-t-butyl-4-hydroxybenzoate,
phenyl 3,5-di-t-butyl-4-hydroxybenzoate,
4-phenoxyphenyl 3,5-di-t-butyl-4-hydroxybenzoate,
4-cyclopropoxyphenyl 3,5-di-octyl-4-hydroxybenzoate,
4-octadecylphenyl 3,5-di-t-amyl-4-hydroxybenzoate,
4-dodecylphenyl 2-n-decyl-4-hydroxybenzoate,
4-octylphenyl saicylate,
4-hexadecylphenyl salicylate, and mixtures thereof.

Presently preferred are hydroxy-substituted phenyl benzoates in which the $R^5$ member is an alkyl, alkoxy, cycloalkyl, cycloalkoxy, aryl or aryloxy member or combination thereof, such as alkaryl or aralkyl, having up to 10 carbon atoms.

In one presently preferred embodiment the hydroxy-substituted phenyl benzoate is 2,4-di-t-butylphenyl 3,5-di-t-butyl-4-hydroxybenzoate.

In a presently preferred embodiment the stabilized compositions of the present invention have incorporated therein a conventional heat stabilizer. The heat stabilizers which are incorporated in the polyolefin are those conventional heat stabilizers known in the art such as the stearically-hindered phenols, sulfides and amines. In a presently preferred embodiment the heat stabilizer is a hindered phenol. Suitable hindered phenol heat stabilizers include: 2,6-di-t-butyl-4-methyl-phenol, octadecyl[3-(3,5-di-t-butyl-4-hydroxyphenyl)] propionate, di-n-octadecyl(3,5-di-t-butyl-4-hydroxybenzyl) phosphonate, tetrakis[methylene(3,5-di-t-butyl-4-hydroxyhydrocinnamate)] methane, 1,3,5- tri-methyl-2,4,6-tris(3,5-di-t-butyl-4-hydroxybenzyl) benzene and tris(3,5-di-t-butyl-4-hydroxybenzyl) isocyanurate.

The amount of the UV stabilizing system to be employed in the polyolefin in accordance with the present invention can be widely varied, depending upon the properties and particular application of the stabilized polyolefin and other factors. Generally, each component of the stabilizing system is employed in an amount ranging from 0.05 to about 5 php (parts per 100 parts of polymer). It is presently preferred that each component be employed in an amount ranging from about 0.1 to about 1.25 php.

The amount of heat stabilizer to be added to the polymeric compositions can vary from about 0.02 to about 1 php, preferably from about 0.05 to about 0.5 php.

The weight ratio of the piperidine derivative to the hydroxy-substituted phenyl benzoate can vary from about 10:1 to about 1:10, preferably from about 3:1 to about 1:3. The weight ratio of the total of the piperidine derivative and the hydroxy-substituted phenyl benzoate to the heat stabilizer can vary from about 100:1 to about 2:1, preferably from about 25:1 to about 4:1.

Other stabilizers, pigments, processing aids, antistatic agents and the like can be added to the composition as desired or required.

The stabilizing systems of the present invention can be incorporated into the polymer in any conventional manner such as by dry blending the additive system directly with polymer pellets or fluff by means of tumble mixers, Henschel blenders and the like. Solutions or slurries of the stabilizers can be sprayed onto or admixed with a gradular polymer. The stabilizers can also be blended with a molten polymer by means of a Banbury mixer, Brabender mixer, roll mill, screw extruder and the like.

The following examples illustrate the invention.

EXAMPLE I

A sample of commercial polypropylene having a nominal melt flow of 3 as determined according to the procedure of ASTM D 1238-62T, Condition L, was divided into aliquot portions. The polymer and, when used, the additives to be incorporated with the polymer was dry blended and the blend was masticated in a Brabender Plastograph at 200°C for 5 minutes under a nitrogen atmosphere. Each resulting product was compression molded into films 5 mils thick. Specimens were cut from each film and exposed to the radiation emitted from a twin- enclosed carbon arc Fade-Ometer modified by the incorporation of 8 fluorescent sun lamps and discontinuance of the spray cycle.

Triplicate film samples were tested for failure every 20 hours by subjecting each film strip to a rolling motion such that the entire length of the film strip was bent approximately 180°. Failure is indicated when a strip breaks.

The results of tests on compositions containing bis(2,2,6,6-tetramethyl- 4-piperidyl) sebacate (identified as sebacate in the following table), 2,4-di-t-butyl-phenyl 3,5-di-t-butyl-4-hydroxybenzoate (identified as benzoate), and tris(3,5-di-t-butyl-4-hydroxybenzyl) isocyanurate (identified as isocyanurate) are given in Table I below. The amounts of each component are expressed in terms of php (parts by weight per 100 parts by weight of polymer):

Table I

| Run | Sebacate, php | Benzoate, php | Isocyanurate, php | Hours to Failure Actual | Hours to Failure Expected |
|---|---|---|---|---|---|
| 1 | 0 | 0 | 0.05 | 73 | — |
| 2 | 0.15 | 0 | .05 | 327 | — |
| 3 | 0.25 | 0 | .05 | 493 | — |
| 4 | 0.35 | 0 | .05 | 513 | — |
| 5 | 0.50 | 0 | .05 | 460[a] | — |
| 6 | 0 | 0.15 | .05 | 207 | — |
| 7 | 0 | 0.25 | .05 | 313 | — |
| 8 | 0 | 0.35 | .05 | 347 | — |
| 9 | 0 | 0.50 | .05 | 367 | — |
| 10 | 0.15 | 0.35 | .05 | 873 | 601 |
| 11 | 0.25 | 0.25 | .05 | 960 | 733 |
| 12 | 0.35 | 0.15 | .05 | 813 | 647 |

[a]Spurious result.

The above date illustrate the unexpected increase in protection against degradation due to ultraviolet light obtained by incorporating the stabilizer system of this invention with polypropylene.

Similar enhanced activity was obtained when octadecyl[3-(3,5-di-t- butyl-4-hydroxyphenyl)] propionate was used as the antioxidant, as shown in Table II below:

Table II

| Run | Sebacate, php | Benzoate, php | Propionate, php | Hours to Failure Actual | Hours to Failure Expected |
|---|---|---|---|---|---|
| 13 | 0 | 0 | 0.1 | 40 | — |
| 14 | 0.15 | 0 | .1 | 340 | — |
| 15 | 0.25 | 0 | .1 | 500 | — |
| 16 | 0.35 | 0 | .1 | 513 | — |
| 17 | 0.50 | 0 | .1 | 693 | — |
| 18 | 0 | 0.15 | .1 | 193 | — |
| 19 | 0 | 0.25 | .1 | 340 | — |
| 20 | 0 | 0.35 | .1 | 400 | — |
| 21 | 0 | 0.50 | .1 | 453 | — |
| 22 | 0.15 | 0.35 | .1 | 973 | 700 |
| 23 | 0.25 | 0.25 | .1 | 1053 | 800 |
| 24 | 0.35 | 0.15 | .1 | 893 | 666 |

Reasonable variations and moficiations, which will be apparent to those skilled in the art, can be made in this invention without departing from the spirit and scope thereof.

What is claimed is:

1. A polyolefin composition stabilized against ultraviolet degradation comprising a normally solid polymer of an aliphatic 1-olefin having from 2 to 8 carbon atoms per molecule having incorporated therein a stabilizing amount of a stabilizing system consisting essentially of:
   A. a piperidine derivative selected from the group consisting of
   1. compounds of the formula

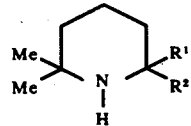

wherein Me is methyl, and $R^1$ and $R^2$ are individually selected from the group consisting of hydrogen and an alkyl member of 1 to 4 carbon atoms;

2. compounds of the formula

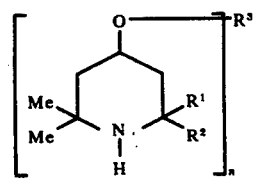

wherein Me, $R^1$ and $R^2$ are as described above, and n is an integer having a value of 1 or 2, wherein
   when n is 1, $R^3$ is selected from the group consisting of hydrogen and an acyl member derived from an unsubtituted, saturated aliphatic monocarboxylic acid having from 6 to 20 carbon atoms or an unsubstituted or alkyl-substituted aromatic monocarboxylic acid having from 7 to 20 carbon atoms,
   when n is 2, $R^3$ is a diacyl member derived from a saturated, unsubstituted aliphatic dicarboxylic acid having from 6 to 20 carbon atoms or an unsubstituted or alkyl-substituted aromatic dicarboxylic acid having from 8 to 20 carbon atoms; and
   3. compounds of the formula

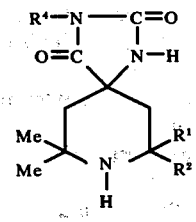

wherein Me, $R^1$ $R^2$ are as defined above and $R^4$ is a member selected from the group consisting of hydrogen and alkyl having from 1 to 12 carbon atoms;
   B. a hydroxy-substituted phenyl benzoate represented by the formula

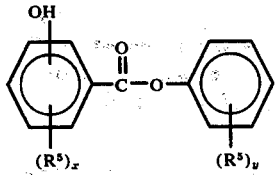

wherein each $R^5$ member is independently selected from the group consisting of halogen, an alkyl, alkoxy, cycloalkyl, cycloalkoxy, aryl or aryloxy member having up to 20 carbon atoms, x is an integer having a value of from 0 to 4 and y is an integer having a value of from 0 to 4.

2. The composition of claim 1 wherein said compound (A) is present in an amount ranging from 0.05 to about 5 php and said compound (B) is present in an approximate amount ranging from 0.05 to about 5 php.

3. The composition of claim 1 wherein said polymer is polypropylene.

4. The composition of claim 1 wherein the weight ratio of said compound (A) to said compound (B) is in the approximate range of 10:1 to 1:10.

5. The composition of claim 1 wherein said compound (A) is present in an approximate amount ranging from 0.1 to 1.25 php and said compound (B) is present in an approximate amount ranging from 0.1 to 1.25 php.

6. The composition of claim 1 wherein said weight ratio of (A):(B) is in the approximate range of 3:1 to 1:3.

7. The composition of claim 1 having additionally incorporated therein (c) a hindered phenol heat stabilizer.

8. The composition of claim 7 wherein said compound (c) is present in an amount ranging from about 0.02 to about 1 php and wherein the weight ratio of (A+B) to (c) is in the approximate range of 100:1 to 2:1.

9. The composition of claim 7 wherein said compound (c) is present in an amount ranging from about 0.05 to about 0.5 php.

10. The composition of claim 7 wherein said compound (A) is bis(2,2,6,6-tetramethyl-4-piperidyl) sebacate, said compound (B) is 2,4-di-t-butylphenyl 3,5-di-t-butyl-4-hydroxybenzoate and said compound (C) is tris(3,5-di-t-butyl-4-hydroxybenzyl) isocyanurate.

11. The composition of claim 7 wherein said compound (A) is bis(2,2,6,6-tetramethyl-4-piperidyl) sebacate, said compound (B) is 2,4-di-t-butylphenyl 3,5-di-t-butyl-4-hydroxybenzoate and said compound (C) is octadecyl [3-(3,5-di-t-butyl-4-hydroxyphenyl)] propionate.

12. A stabilizer system for polymers consisting essentially of a mixture of:
A. a piperidine derivative selected from the group consisting of
1. compounds of the formula

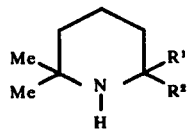

wherein Me is methyl, and $R^1$ and $R^2$ are individually selected from the group consisting of hydrogen and an alkyl member of 1 to 4 carbon atoms;

2. compounds of the formula

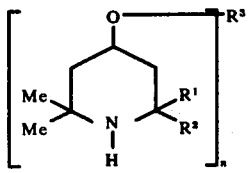

wherein Me, $r^1$ and $R^2$ are as described above, and $n$ is an integer having a value of 1 or 2, wherein
when $n$ is 1, $R^3$ is selected from the group consisting of hydrogen and an acyl member derived from an unsubstituted, saturated aliphatic monocarboxylic acid having from 6 to 20 carbon atoms or an unsubstituted or alkyl-substituted aromatic monocarboxylic acid having from 7 to 20 carbon atoms,
when $n$ is 2, $R^3$ is a diacyl member derived from a saturated, unsubstituted aliphatic dicarboxylic acid having from 6 to 20 carbon atoms or a unsubstituted or alkyl-substituted aromatic dicarboxylic acid having from 8 to 20 carbon atoms; and 3. compounds of the formula

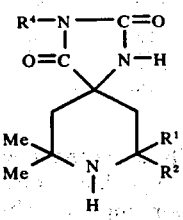

wherein Me, $R^1$ and $R^2$ are as defined above and $R^4$ is a member selected from the group consisting of hydrogen and alkyl having from 1 to 12 carbon atoms; and B. a hydroxy-substituted phenyl benzoate represented by the formula

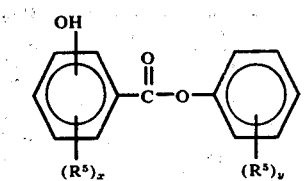

wherein each $R^5$ member is independently selected from the group consisting of halogen, an alkyl, alkoxy, cycloalkyl, cycloalkoxy, aryl or aryloxy member having up to 20 carbon atoms, $x$ is an integer having a value of from 0 to 4 and $y$ is an integer having a value of from 0 to 4.

13. The system of claim 12 wherein the weight ratio of said compound (A) to said compound (B) is in the approximate range of 10:1 to 1:10.

14. The system of claim 12 wherein the weight ratio of said compound (A) to said compound (B) is in the approximate range of 3:1 to 1:3.

15. The system of claim 12 wherein said compound (A) is bis(2,2,6,6-tetramethyl-4-piperidyl) sebacate and said compound (B) is 2,4-di-t-butylphenyl 3,5-di-t-butyl-4-hydroxybenzoate.

16. The system of claim 12 having additionally incorporated therewith (c) at least one hindered phenol heat stabilizer.

* * * * *